United States Patent
Park et al.

(10) Patent No.: US 10,433,265 B2
(45) Date of Patent: *Oct. 1, 2019

(54) METHOD FOR CONTROLLING TRANSMISSION POWER OF SOUNDING REFERENCE SIGNAL IN WIRELESS COMMUNICATION SYSTEM AND APPARATUS FOR SAME

(71) Applicant: LG ELECTRONICS INC., Seoul (KR)

(72) Inventors: Jonghyun Park, Seoul (KR); Hanbyul Seo, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 3 days.

This patent is subject to a terminal disclaimer.

(21) Appl. No.: 15/830,565

(22) Filed: Dec. 4, 2017

(65) Prior Publication Data

US 2018/0152900 A1 May 31, 2018

Related U.S. Application Data

(63) Continuation of application No. 14/442,351, filed as application No. PCT/KR2014/005515 on Jun. 23, 2014, now Pat. No. 9,872,259.

(Continued)

(51) Int. Cl.
*H04W 52/32* (2009.01)
*H04L 5/00* (2006.01)
(Continued)

(52) U.S. Cl.
CPC ......... *H04W 52/325* (2013.01); *H04L 5/0048* (2013.01); *H04L 5/0051* (2013.01);
(Continued)

(58) Field of Classification Search
None
See application file for complete search history.

(56) References Cited

U.S. PATENT DOCUMENTS

| | | | | |
|---|---|---|---|---|
| 2009/0323664 | A1* | 12/2009 | Li | H04L 5/0051 370/344 |
| 2010/0074205 | A1* | 3/2010 | Papasakellariou | H04L 5/0007 370/329 |

(Continued)

FOREIGN PATENT DOCUMENTS

| | | |
|---|---|---|
| CN | 102291209 A | 12/2011 |
| JP | 2013030858 A | 2/2013 |

(Continued)

OTHER PUBLICATIONS

"Further Enhancements to LTE TDD for DL-UL Interference Management and Traffic Adaptation," 3GPP Draft; R1-132802_TDD_EIMTA_Summary, 3rd Generation Partnership Project (3GPP), Mobile Competence Centre; 650, 4 pages.

(Continued)

*Primary Examiner* — Jamaal Henson
(74) *Attorney, Agent, or Firm* — Dentons US LLP

(57) ABSTRACT

Disclosed in the present application is a method for transmitting a sounding reference signal (SRS) from a terminal to a base station in a time division duplex (TDD) system. More specifically, the method comprises: a step of establishing a first subframe set and a second subframe set through an upper layer, and step of transmitting the sounding reference signal from a specific subframe to the base station, wherein the first subframe set and the second subframe set are configured by an uplink subframe and/or a special subframe, each of the first subframe and the second subframe is associated with a power control process for transmitting an uplink data channel, and wherein the transmission power of the sounding reference signal is determined on the basis of (Continued)

a specific power control process associated with a subframe set to which the specific subframe belongs, from among the first subframe set and the second subframe set.

8 Claims, 10 Drawing Sheets

Related U.S. Application Data

(60) Provisional application No. 61/838,849, filed on Jun. 24, 2013, provisional application No. 61/842,369, filed on Jul. 2, 2013, provisional application No. 61/894,396, filed on Oct. 22, 2013, provisional application No. 61/897,210, filed on Oct. 29, 2013, provisional application No. 61/931,559, filed on Jan. 24, 2014.

(51) Int. Cl.
  *H04L 5/14* (2006.01)
  *H04W 52/14* (2009.01)
  *H04B 7/26* (2006.01)
  *H04W 88/08* (2009.01)
  *H04L 1/18* (2006.01)

(52) U.S. Cl.
  CPC .............. *H04L 5/14* (2013.01); *H04L 5/1469* (2013.01); *H04W 52/146* (2013.01); *H04B 7/2656* (2013.01); *H04L 1/1854* (2013.01); *H04L 5/0092* (2013.01); *H04W 88/08* (2013.01)

(56) References Cited

U.S. PATENT DOCUMENTS

| | | | | |
|---|---|---|---|---|
| 2012/0149426 A1* | 6/2012 | Nakamura | ............ | G01S 5/0215 455/522 |
| 2012/0224552 A1* | 9/2012 | Feuersanger | ......... | H04L 5/0007 370/329 |
| 2012/0300681 A1* | 11/2012 | Ji | ........................ | H04W 56/00 370/280 |
| 2013/0301492 A1* | 11/2013 | Ji | ....................... | H04W 72/042 370/280 |
| 2014/0056278 A1 | 2/2014 | Marinier et al. | | |

FOREIGN PATENT DOCUMENTS

| | | |
|---|---|---|
| WO | 2012107102 A1 | 8/2012 |
| WO | 2012141497 | 10/2012 |
| WO | 2013/004007 A1 | 1/2013 |

OTHER PUBLICATIONS

Nokia Corporation et al., "Enhanced uplink power control for dynamic TDD UL/DL reconfiguration," R1-132295, 3GPP TSG-RAN WG1 Meeting #73, Fukuoka, Japan, May 20-24, 2013, see pp. 1-8, and figures 1, 2.

Samsung, "DL and UL Power Control for eIMTA," R1-131965, 3GPP TSG-RAN WG1 Meting #73, Fukuoka, Japan, May 20-24, 2013, see pp. 1-3.

CATT, "Further study on the uplink power control," R1-131880, 3GPP TSG-RAN WG1 Meeting #73, Fukuoka, Japan, May 20-24, 2013, see pp. 1-6.

ZTE, "UL PC enhancement in multi-cell scenario," R1-132105, 3GPP TSG-RAN WG1 Meeting #73, Fukuoka, Japan, May 20-24, 2013, see pp. 15.

* cited by examiner

E-UMTS

FIG. 2
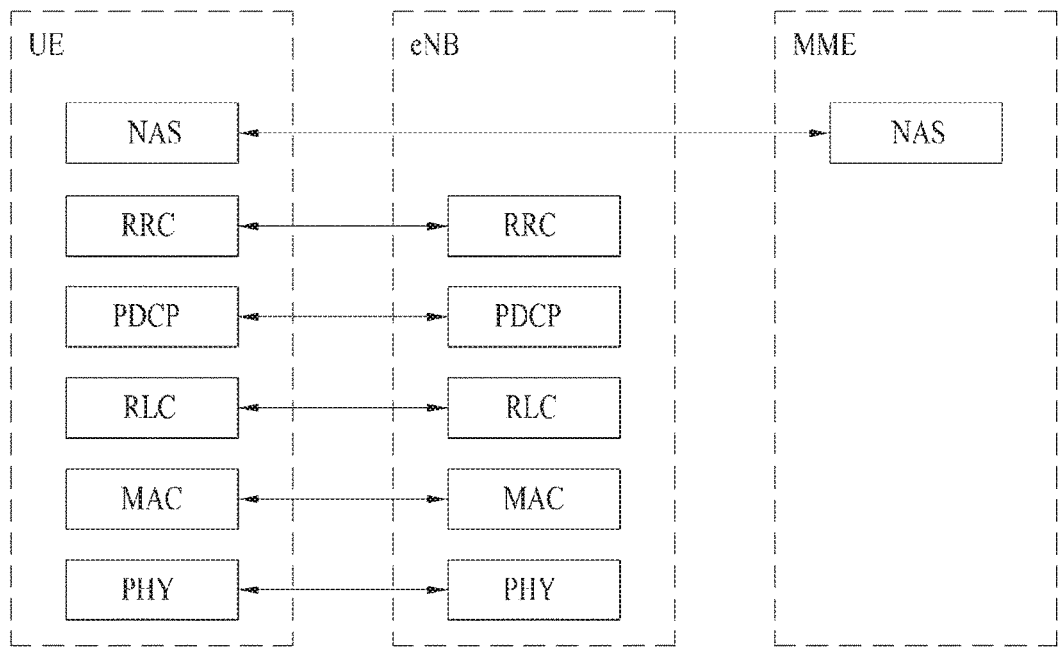
(a) Control-plane protocol stack
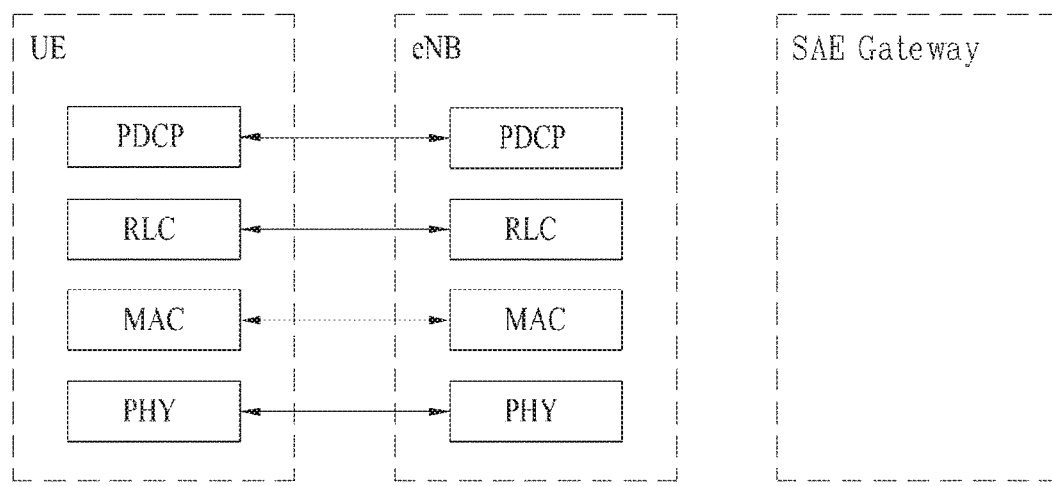
(b) User-plane protocol stack

METHOD FOR CONTROLLING TRANSMISSION POWER OF SOUNDING REFERENCE SIGNAL IN WIRELESS COMMUNICATION SYSTEM AND APPARATUS FOR SAME

This application is a continuation of U.S. application Ser. No. 14/442,351, filed on May 12, 2015 now allowed, which is a 371 national stage entry of International Application No. PCT/KR2014/005515, filed on Jun. 23, 2014, and claims the benefit of U.S. Provisional Application No. 61/838,849, filed on Jun. 24, 2013, U.S. Provisional Application No. 61/842,369, filed on Jul. 2, 2013, U.S. Provisional Application No. 61/894,396, filed on Oct. 22, 2013, U.S. Provisional Application No. 61/897,210, filed on Oct. 29, 2013, and U.S. Provisional Application No. 61/931,559, filed on Jan. 24, 2014 all of which are incorporated by reference in their entirety herein.

TECHNICAL FIELD

The present invention relates to a wireless communication system and, more specifically, to a method for controlling transmission power of a sounding reference signal in a wireless communication system and an apparatus for the same.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power.

DISCLOSURE

Technical Problem

An object of the present invention devised to solve the problem lies in a method for controlling transmission power of a sounding reference signal in a wireless communication system and an apparatus for the same.

Technical Solution

In an aspect of the present invention, a method for transmitting, by a UE, a sounding reference signal (SRS) to a base station in a time division duplex (TDD) system includes: configuring a first subframe set and a second subframe set through a higher layer; and transmitting the sounding reference signal to the base station through a specific subframe, wherein the first subframe set and the second subframe set are configured by at least one of an uplink subframe and a special subframe, wherein each of the first subframe and the second subframe is associated with a power control process for uplink data channel transmission, wherein transmission power of the sounding reference signal is determined on the basis of a predetermined power control process associated with a subframe set to which the specific subframe belongs, from among the first subframe set and the second subframe set.

In another aspect of the present invention, a method for receiving, by a base station, a sounding reference signal (SRS) from a UE in a TDD system includes: configuring a first subframe set and a second subframe set through a higher layer; and receiving the sounding reference signal from the UE through a specific subframe, wherein the first subframe set and the second subframe set are configured by at least one of an uplink subframe and a special subframe, wherein each of the first subframe and the second subframe is associated with a power control process for uplink data channel transmission, wherein transmission power of the sounding reference signal is determined on the basis of a predetermined power control process associated with a subframe set to which the specific subframe belongs, from among the first subframe set and the second subframe set.

The transmission power of the sounding reference signal may be determined using one or more parameters defined in the predetermined power control process.

The first subframe set may include a subframe fixed as an uplink subframe and the special frame only. An uplink subframe included in the second subframe set may be a subframe changeable to a downlink subframe according to instruction of the base station.

The special subframe may include a region for uplink transmission, and only the sounding reference signal may be transmitted in the region for uplink transmission.

Transmission power of a sounding reference signal transmitted in a first special subframe and transmission power of a sounding reference signal transmitted in a second special subframe may be independently determined.

Advantageous Effects

According to embodiments of the present invention, a terminal can efficiently control transmission power of a sounding reference signal in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram of structures of control and user planes of radio interface protocol between a 3GPP radio access network standard-based user equipment and E-UTRAN.

BEST MODE

Figure 1:
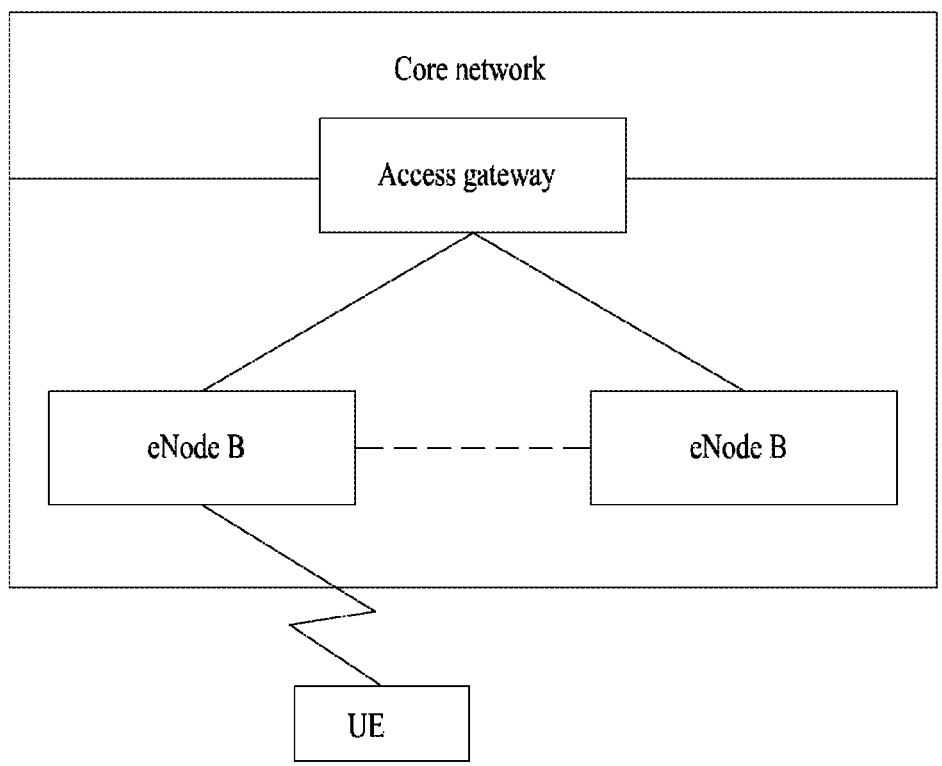
FIG. 1 is a schematic diagram of an E-UMTS network structure as one example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD. And, in the present specification, a base station can be named by such a comprehensive terminology as an RRH (remote radio head), an eNB, a TP (transmission point), an RP (reception point), a relay and the like.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
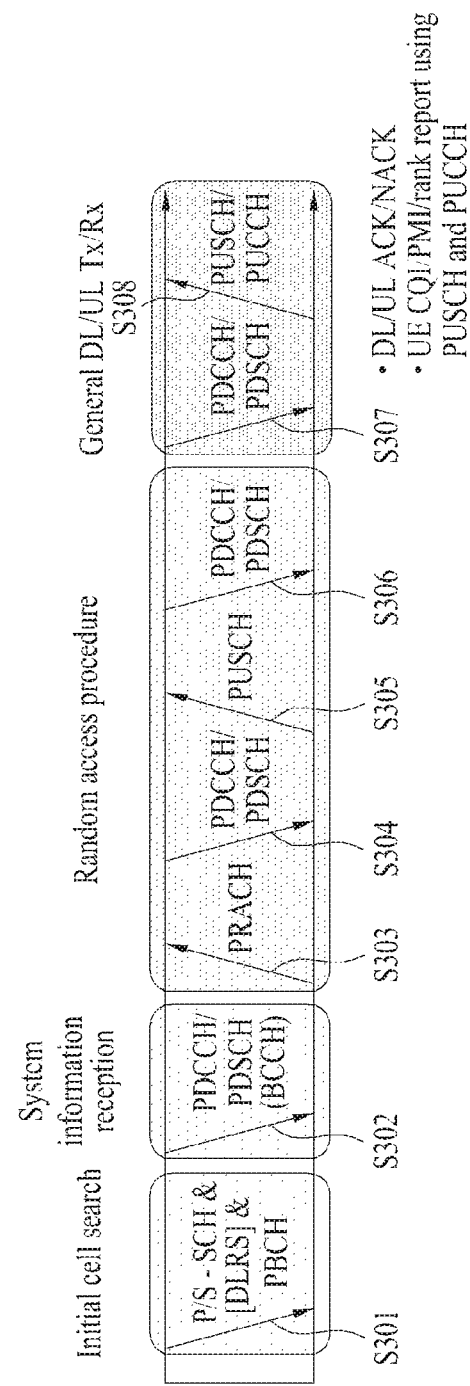
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
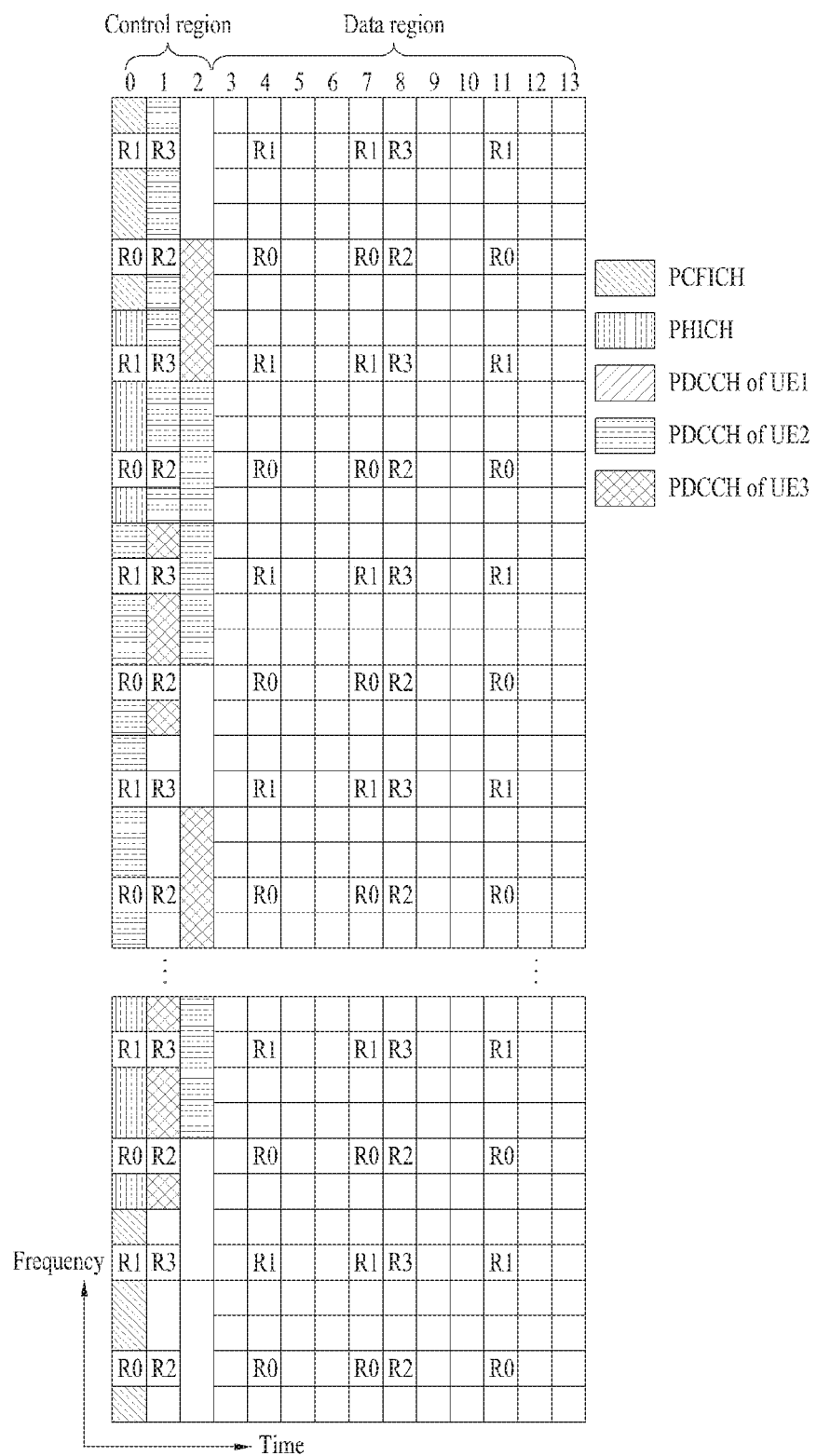
FIG. 4 is a diagram of a structure of a downlink radio frame in an LTE system.

FIG. 4 is a diagram for showing an example of a control channel included in a control region of a single subframe in a DL radio frame.

Referring to FIG. 4, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS) or a pilot signal for an antenna 0 to 3. The RS is fixed as a constant pattern in the subframe irrespective of the control region and the data region. The control channel is assigned to a resource to which the RS is not assigned in the control region and a traffic channel is also assigned to a resource to which the RS is not assigned in the data region. The control channel assigned to the control region may include a physical control format indicator channel (PCFICH), a physical hybrid-ARQ indicator channel (PHICH), a physical downlink control channel (PDCCH), and the like.

The PCFICH (physical control format indicator channel) informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier x one OFDM symbol'. The value of the PCFICH may indicate the value of 1 to 3 or 2 to 4 according to a bandwidth and is modulated into a QPSK (quadrature phase shift keying).

The PHICH (physical HARQ (hybrid-automatic repeat and request) indicator channel) is used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH (physical DL control channel) is assigned to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on a user equipment (one or a plurality of user equipments) receiving data of PDSCH, a method of receiving and decoding the PDSCH data performed by the user equipment, and the like is transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transport block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 5:
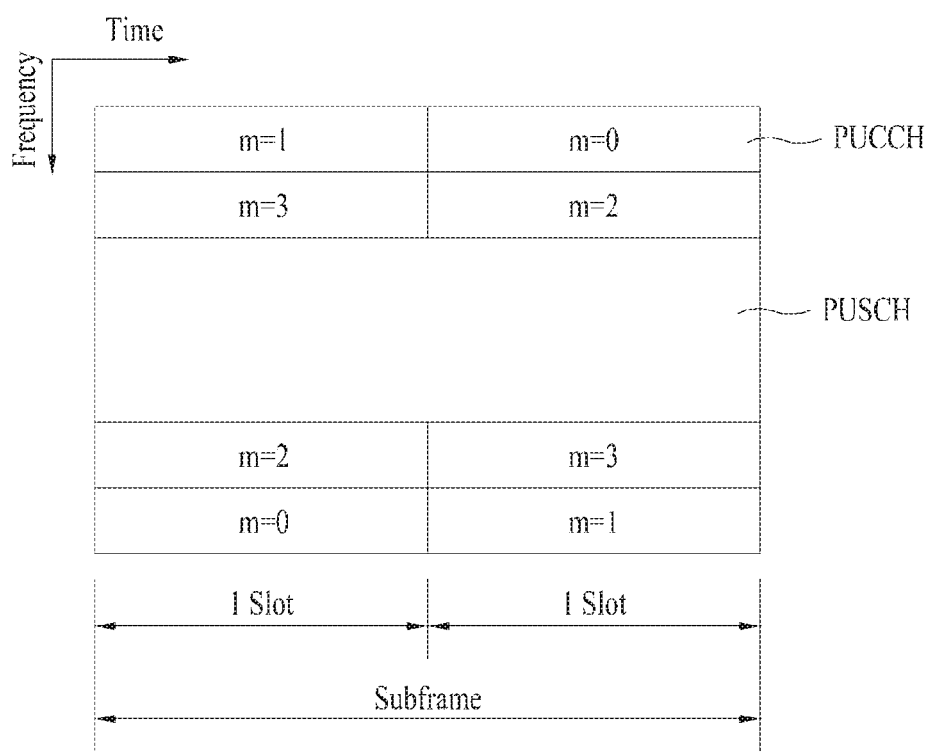
FIG. 5 is a diagram for a structure of an uplink radio frame in an LTE system.

FIG. 5 is a diagram for a structure of an uplink subframe used in LTE system.

Referring to FIG. 5, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 5 shows an example that the PUCCHs satisfying conditions (e.g., m=0, 1, 2, 3) are assigned to a subframe.

A time within one subframe, in which a sounding reference signal can be transmitted, corresponds to the last symbol in the time domain in the subframe, and the sounding reference signal is transmitted through a data transmission band in the frequency domain. Sounding reference signals of multiple UEs, which are transmitted through the last symbol of the same subframe, can be discriminated according to frequency positions.

Figure 6:
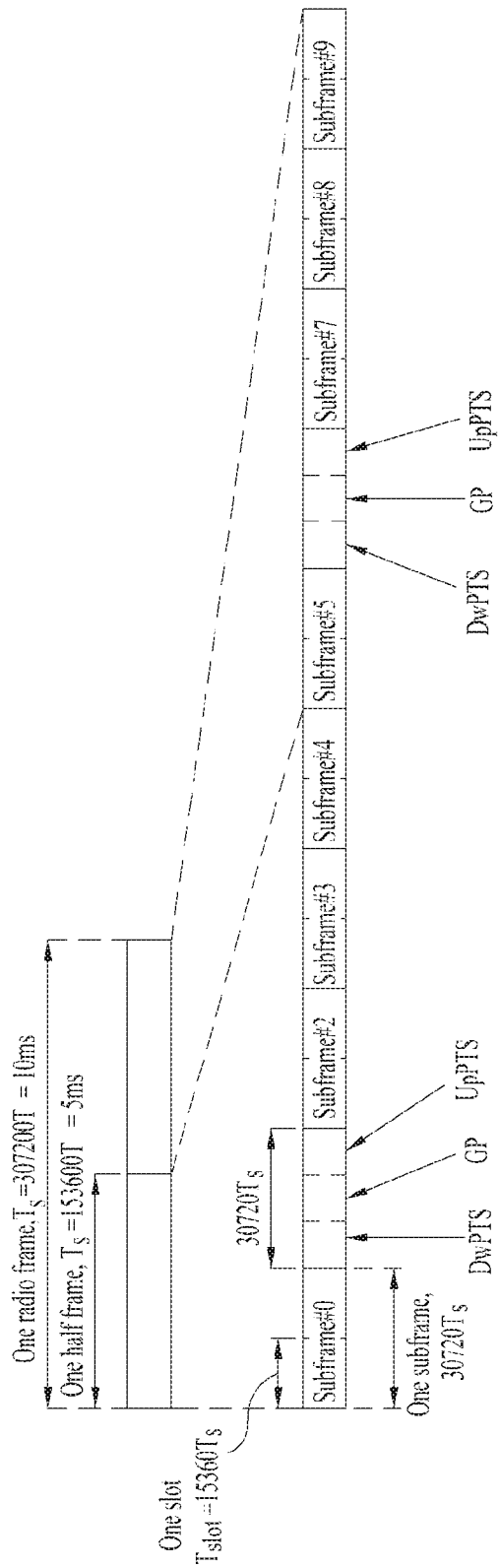
FIG. 6 illustrates a structure of a radio frame in an LTE TDD system.

FIG. 6 illustrates a structure of a radio frame in an LTE TDD system. In the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

Meanwhile, in an LTE TDD system, a UL/DL configuration is shown in Table 1 below.

TABLE 1

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In [Table 1] above, D, U, and S refer to a downlink subframe, an uplink subframe, and the special subframe. In addition, [Table 1] also shows downlink-to-uplink switch-point periodicity in an uplink/downlink subframe configuration in each system.

Figure 7:
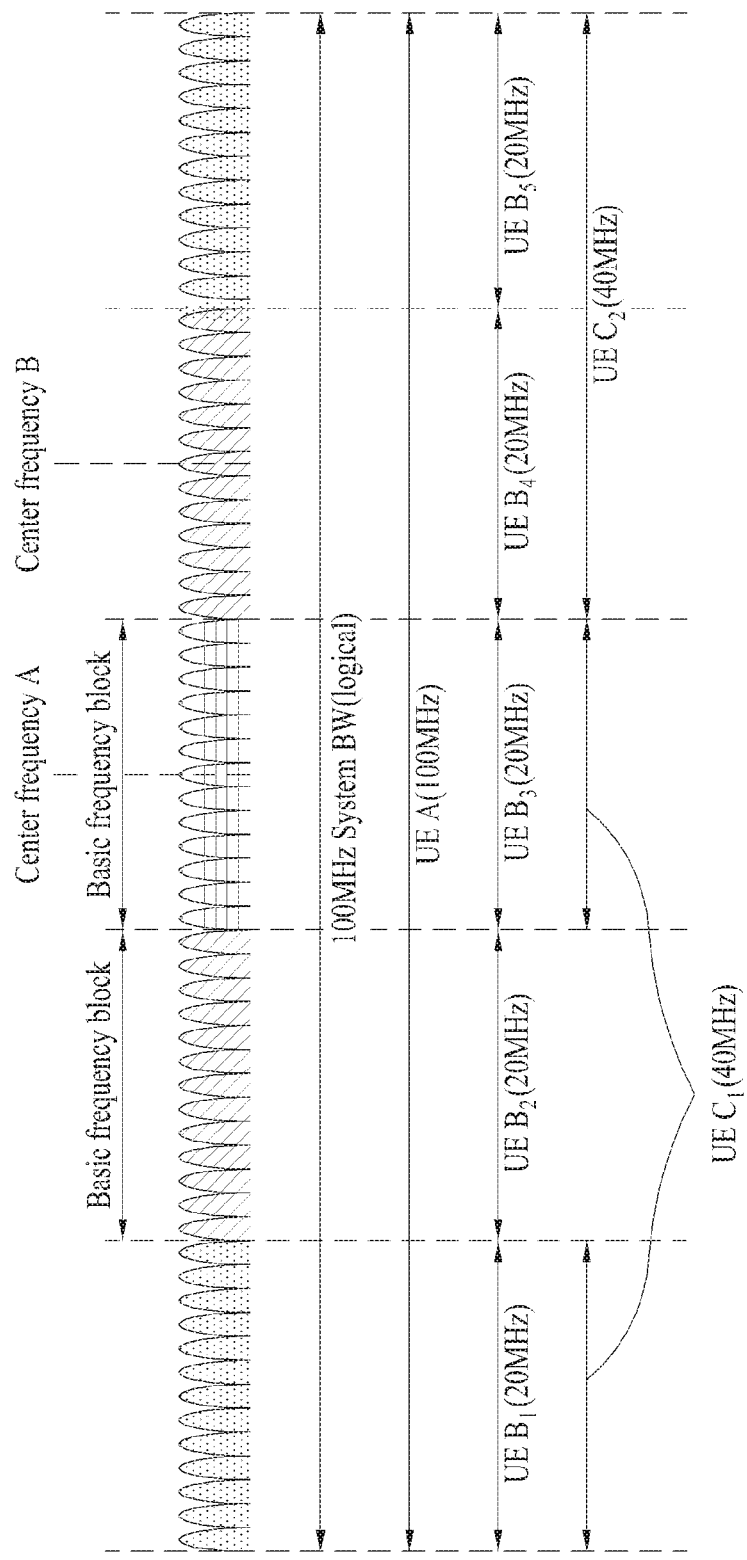
FIG. 7 is a view illustrating a concept of a carrier aggregation scheme.

Hereinafter, a carrier aggregation scheme will be described. FIG. 7 is a view illustrating concept of a carrier aggregation scheme.

The carrier aggregation refers to a method of using a plurality of frequency blocks or (logical) cells including uplink resources (or component carriers) and/or downlink resources (or component carriers) by a UE as one large logical frequency band in order to use a wider frequency band by a wireless communication system. Hereinafter, for convenience of description, the term 'component carrier' will consistently used.

Referring to FIG. 7, a system bandwidth (system BW) has a maximum of 100 MHz as a logical bandwidth. The system BW includes five component carriers. Each component carrier has a maximum of 20 MHz of bandwidth. A component carrier includes one or more physically consecutive subcarriers. Although FIG. 7 illustrates the case in which component carriers have the same bandwidth, the case is purely exemplary, and thus, the component carriers may have different bandwidths. In addition, although FIG. 7 illustrates the case in which the component carriers are adjacent to each other in the frequency domain, FIG. 7 are logically illustrated, and thus, the component carriers may be physically adjacent to each other or may be spaced apart from each other.

Component carriers can use different center frequencies or use one common center frequency with respect to physically adjacent component carriers. For example, in FIG. 8, assuming all component carriers are physically adjacent to each other, center frequency A may be used. In addition, assuming that component carriers are not physically adjacent to each other, center frequency A, center frequency B, etc. may be used with respect to the respective component carriers.

Throughout this specification, a component carrier may correspond to a system band of a legacy system. The component carrier is defined based on a legacy system, and thus, it can be easy to provide backward compatibility and to design the system in a wireless communication environment in which an evolved UE and a legacy UE coexist. For example, when an LTE-A system supports carrier aggregation, each component carrier may corresponds to a system band of an LTE system. In this case, the component carrier may have any one of bandwidths of 1.25, 2.5, 5, 10, and 20 Mhz.

When a system band is extended via carrier aggregation, a frequency band used for communication with each UE is defined in a component carrier unit. UE A may use 100 MHz as a system band and perform communication using all five component carriers. UEs $B_1$ to $B_5$ can use only a bandwidth of 20 MHz and perform communication using one component carrier. UEs $C_1$ and $C_2$ can use a bandwidth of 40 MHz and communication using two component carries. The two component carriers may or may not be logically/physically adjacent to each other. UE $C_1$ refers to the case in which two component carriers that are not adjacent to each other are used and UE $C_2$ refers to the case in which two adjacent component carriers are used.

An LTE system may use one downlink component carrier and one uplink component carrier, whereas an LTE-A system may use a plurality of component carriers as illustrated in FIG. 6. In this case, a method for scheduling a data channel by a control channel may be classified into a linked carrier scheduling method and a cross carrier scheduling method.

In more detail, in the linked carrier scheduling method, a control channel transmitted through a specific component carrier schedules only a data channel through the specific component carrier like in a legacy LTE system using a single component carrier.

Meanwhile, in the cross carrier scheduling method, a control channel transmitted through a primary component carrier (primary CC) using a carrier indicator field (CIF) schedules a data channel transmitted through the primary CC or other CC, that is, a secondary CC.

A description will be given of a method for controlling uplink transmission power in an LTE system.

A method for controlling, by a UE, uplink transmission power thereof includes open loop power control (OLPC) and closed loop power control (CLPC). The former controls power in such a manner that attenuation of a downlink signal from a base station of a cell to which a UE belongs is estimated and compensated for. OLPC controls uplink power by increasing uplink transmission power when downlink signal attenuation increases as a distance between the UE and the base station increases. The latter controls uplink power in such a manner that the base station directly transmits information (i.e. a control signal) necessary to control uplink transmission power.

The following equation 1 is used to determine transmission power of a UE when a serving cell c transmits only a PUSCH instead of simultaneously transmitting the PUSCH and a PUCCH in a subframe corresponding to a subframe index i in a system that supports carrier aggregation.

[Equation 1]

$$P_{PUSCH,c}(i) = \min \begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dBm]$$

The following equation 2 is used to determine PUSCH transmission power when the serving cell c simultaneously transmits the PUCCH and the PUSCH in the subframe corresponding to the subframe index i in a system supporting carrier aggregation.

[Equation 2]

$$P_{PUSCH,c}(i) = \min \begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dBm]$$

Parameters, which will be described in association with Equations 1 and 2, determine uplink transmission power of a UE in the serving cellc. Here, $P_{CMAX,c}(i)$ in Equation 1 indicates maximum transmittable power of the UE in the subframe corresponding to the subframe index i and $\hat{P}_{CMAX,c}(i)$ in Equation 2 indicates a linear value of $P_{CMAX,c}(i)$. $\hat{P}_{PUCCH}(i)$ in Equation 2 indicates a linear value of $P_{PUCCH}(i)$ ($P_{PUCCH}(i)$ indicating PUCCH transmission power in the subframe corresponding to subframe index (i).

In Equation 1, $M_{PUSCH,c}(i)$ is a parameter indicating a PUSCH resource allocation bandwidth, which is represented as the number of resource blocks valid for the subframe index i, and is allocated by a base station. $P_{O\_PUSCH,c}(j)$ is a parameter corresponding to the sum of a cell-specific nominal component $P_{O\_NOMINAL\_PUSCH,c}(j)$ provided by a higher layer and a UE-specific component $P_{O\_UE\_PUSCH,c}(j)$ provided by the higher layer and is signaled to the UE by the base station.

j is 1 in PUSCH transmission/retransmission according to an uplink grant and is 2 in PUSCH transmission/retransmission according to a random access response. In addition, $P_{O\_UE\_PUSCH,c}(2)=0$ and $P_{O\_NOMINAL\_PUSCH,c}(2)=P_{O\_PRE}+\Delta_{PREAMBLE\_Msg3}$. Parameters $P_{O\_PRE}$ and $\Delta_{PREAMBLE\_Msg3}$ are signaled by the higher layer.

$\alpha_c(j)$ is a pathloss compensation factor and a cell-specific parameter provided by the higher layer and transmitted as 3 bits by the base station. $\alpha \in \{0, 0.4, 0.5, 0.6, 0.7, 0.8, 0.9, 1\}$ when j is 0 or 1 and $\alpha_c(j)=1$ when is 2. $\alpha_c(j)$ is a value signaled to the UE by the base station.

Pathloss $PL_c$ is a downlink pathloss (or signal loss) estimate value in dBs, calculated by the UE, and is represented as $PL_c$=referenceSignalPower−higher layer filteredRSRP. Here, referenceSignalPower can be signaled to the UE by the base station via the higher layer.

$f_c(i)$ is a value indicating current PUSCH power control adjustment state for the subframe index i and can be represented as a current absolute value or accumulated value. When accumulation is enabled on the basis of a parameter provided by the higher layer or a TPC command $\delta_{PUSCH,c}$ is included in a PDCCH along with DCI format 0 for the serving cell c in which CRC is scrambled with temporary C-RNTI, $f_c(i)=f_c(i-1)+\delta_{PUSCH,c}(i-K_{PUSCH})$ is satisfied. $\delta_{PUSCH,c}(i-K_{PUSCH})$ is signaled through the PDCCH with DCI format 0/4 or 3/3A in a subframe $i-K_{PUSCH}$. Here, $f_c(0)$ is the first value after reset of the accumulated value.

$K_{PUSCH}$ is defined in LTE as follows.

For FDD (Frequency Division Duplex), $K_{PUSCH}$ has a value of 4. As to TDD, $K_{PUSCH}$ has values as shown in Table 2.

TABLE 2

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

The UE attempts to decode a PDCCH in DCI format 0/4 with C-RNTI thereof or to decode a PDCCH in DCI format 3/3A and a DCI format for SPS C-RNTI with TPC-PUSCH-RNTI thereof in each subframe in cases other than DRX state. When DCI formats 0/4 and 3/3A for the serving cell c are detected in the same subframe, the UE needs to use $\delta_{PUSCH,c}$ provided in DCI format 0/4. When a TPC command decoded for the serving cell c is not present, DRX is generated or a subframe having index i is a subframe other than an uplink subframe in TDD, $\delta_{PUSCH,c}$ is 0 dB.

Accumulated $\delta_{PUSCH,c}$, which s signaled together with DCI format 0/4 on a PDCCH, is shown in Table 3. When a PDCCH with DCI format 0 is validated through SPS activation or released, $\delta_{PUSCH,c}$ is 0 dB. Accumulated, which is signaled with DCI format 3/3A on a PDCCH, is one of SET1 of Table 3 or one of SET2 of Table 4, determined by a TPC-index parameter provided by the higher layer.

TABLE 3

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | −1 | −4 |
| 1 | 0 | −1 |
| 2 | 1 | 1 |
| 3 | 3 | 4 |

TABLE 4

| TPC Command Field in DCI format 3A | Accumulated $\delta_{PUSCH,c}$ [dB] |
|---|---|
| 0 | −1 |
| 1 | 1 |

When the UE reaches maximum transmission power $\hat{P}_{CMAX}(i)$ in the serving cell c, a positive TPC command is not accumulated for the serving cell c. Conversely, when the UE reaches minimum transmission power, a negative TPC command is not accumulated.

The following equation 3 is related to uplink power control with respect to a PUCCH in LTE.

transmit a PUCCH over through antenna ports, $\Delta_{TxD}(F')$ is provided to the UE by the higher layer. In other cases, $\Delta_{TxD}(F')$ is 0. Parameters with respect to a cell having the cell index c will now be described.

$P_{CMAX,c}(i)$ indicates maximum transmission power of a UE, $P_{0\_PUCCH}$ is a parameter corresponding to the sum of cell-specific parameters and signaled by a base station through higher layer signaling, $PL_c$ is a downlink pathloss (or signal loss) estimate value calculated in dBs by the UE and is represented as $PL_c$=referenceSignalPower−higher layer filteredRSRP. h(n) is a value depending on PUCCH format, $n_{CQI}$ is the number of information bits with respect to channel quality information (CQI) and $n_{HARQ}$ indicates the number of HARQ bits. In addition, $\Delta_{F\_PUCCH}(F)$ is a relative value with respect to PUCCH format 1a and a value corresponding to PUCCH format #F, which is signaled by the base station through higher layer signaling. g(i) indicates a current PUCCH power control adjustment state of a subframe having index i.

g(0)=0 when $P_{O\_UE\_PUCCH}$ is changed in the higher layer and g(0)=$\Delta P_{rampup}+\delta_{msg2}$ otherwise. $\delta_{msg2}$ is a TPC command indicated in a random access response $\Delta P_{rampup}$ corresponds to total power ramp-up from the first to last preambles, provided by the higher layer.

When a UE reaches maximum transmission power $P_{CMAX,c}(i)$ in a primary cell, a positive TPC command is not accumulated for the primary cell. When the UE reaches minimum transmission power, a negative TPC command is not accumulated. The UE resets accumulation when $P_{O\_UE\_PUCCH}$ is changed by the higher layer or upon reception of a random access response.

Tables 5 and 6 show $\delta_{PUCCH}$ indicated by a TPC command in DCI formats. Particularly, Table 5 shows $\delta_{PUCCH}$ indicated in DCI formats other than DCI format 3A and Table 6 shows $\delta_{PUCCH}$ indicated in DCI format 3A.

TABLE 5

| TPC Command Field in DCI format 1A/1B/1D/ 1/2A/2B/2C/2D/2/3 | $\delta_{PUCCH}$ [dB] |
|---|---|
| 0 | −1 |
| 1 | 0 |
| 2 | 1 |
| 3 | 3 |

TABLE 6

| TPC Command Field in DCI format 3A | $\delta_{PUCCH}$ [dB] |
|---|---|
| 0 | −1 |
| 1 | 1 |

The following equation 4 is associated with sounding reference signal (SRS) power control in LTE.

[Equation 3]
$$P_{PUCCH}(i) = \min\left\{\begin{array}{l}P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i)\end{array}\right\} [\text{dBm}]$$

[Equation 4]
$$P_{SRS,c}(i) = \min\left\{\begin{array}{l}P_{CMAX,c}(i) \\ P_{SRS\_OFFSET,c}(m) + 10\log_{10}(M_{SRS,c}) + \\ P_{O\_PUSCH,c}(j) + \alpha_c(j) \cdot PL_c + f_c(i)\end{array}\right\} [\text{dBm}]$$

In Equation 3, i indicates a subframe index and c indicates a cell index. When a UE is configured by a higher layer to In Equation 4, i is a subframe index and c is a cell index. Here, $P_{CMAX,c}(i)$ indicates maximum transmission power of a UE and $P_{SRS\_OFFSET,c}(m)$ is a value set by a higher layer. m=0 corresponds to transmission of a periodic sounding reference signal whereas m=0 corresponds to transmission of an aperiodic sounding reference signal. $M_{SRS,c}$ is a sounding reference signal bandwidth in the subframe having index i of the serving cell c, which is represented as the number of resource blocks.

$f_c(i)$ is a value indicating a current PUSCH power control adjustment state for subframe index i of the serving cell c and $P_{O\_PUSCH,c}(j)$ and $\alpha_c(j)$ are as described in Equations 1 and 2.

The sounding reference signal will now be described.

The sounding reference signal includes a constant amplitude zero auto correlation (CAZAC) sequence. The sounding reference signals transmitted from a plurality of user equipments are CAZAC sequences $r^{SRS}(n)=r_{u,v}^{(\alpha)}(n)$ having different cyclic shift values α based on the following Equation 5.

$$\alpha = 2\pi \frac{n_{SRS}^{cs}}{8} \quad \text{[Equation 5]}$$

In the Equation 5, $n_{SRS}^{cs}$ is a value set for each user equipment by the upper layer, and has an integer value between 0 and 7. Accordingly, the cyclic shift value may have eight values depending on $n_{SRS}^{cs}$.

The CAZAC sequences generated through cyclic shift from one CAZAC sequence are characterized in that they have a zero-correlation value with the sequences having different cyclic shift values. The sounding reference signals of the same frequency domain can be identified from one another depending on the CAZAC sequence cyclic shift value by using the above characteristic. The sounding reference signal of each user equipment is allocated on the frequency depending on a parameter set by the base station. The user equipment performs frequency hopping of the sounding reference signal to transmit the sounding reference signal to all of uplink data transmission bandwidths.

Hereinafter, a detailed method for mapping a physical resource for transmitting a sounding reference signal in an LTE system will be described.

After being multiplied by an amplitude scaling parameter $\beta_{SRS}$ to satisfy the transmission power $P_{SRS}$ of the user equipment, the sounding reference signal sequence $r^{SRS}(n)$ is mapped into a resource element (RE) having an index of (k, l) from $r^{SRS}(0)$ by the following Equation 6.

$$a_{2k+k_0,l} = \begin{cases} \beta_{SRS} r^{SRS}(k) & k = 0, 1, \ldots, M_{sc,b}^{RS} - 1 \\ 0 & \text{otherwise} \end{cases} \quad \text{[Equation 6]}$$

In the Equation 6, $k_0$ denotes a frequency domain start point of the sounding reference signal, and is defined by the following Equation 7.

$$k_0 = k_0' + \sum_{b=0}^{B_{SRS}} 2M_{sc,b}^{RS} n_b \quad \text{[Equation 7]}$$

In the Equation 7, $n_b$ denotes a frequency location index. Also, $k_0'$ for a general uplink subframe is defined by the following Equation 8, and $k_0'$ for an uplink pilot timeslot (UpPTS) is defined by the following Equation 9.

$$k_0' = (\lfloor N_{RB}^{UL}/2 \rfloor - m_{SRS,0}/2) N_{SC}^{RB} + k_{TC} \quad \text{[Equation 8]}$$

$$k_0' = \begin{cases} (N_{RB}^{UL} - m_{SRS,0}^{max}) N_{sc}^{RB} + k_{TC} & \text{if } ((n_f \bmod 2) \times (2 - N_{SP}) + n_{hf}) \bmod 2 = 0 \\ k_{TC} & \text{otherwise} \end{cases} \quad \text{[Equation 9]}$$

In the Equation 8 and the Equation 9, $k_{TC}$ is a transmission Comb parameter signaled to the user equipment through the upper layer and has a value of 0 or 1. Also, $n_{hf}$ is 0 at the uplink pilot timeslot of the first half frame and 0 at the uplink pilot timeslot of the second half frame. $M_{sc,b}^{RS}$ is a length, i.e., bandwidth, of a sounding reference signal sequence, which is expressed in a unit of subcarrier defined as expressed by the following Equation 10.

$$M_{sc,b}^{RS} = m_{SRS,b} N_{sc}^{RB}/2 \quad \text{[Equation 10]}$$

In the Equation 10, $m_{SRS,b}$ is a value signaled from the base station depending on an uplink bandwidth $N_{RB}^{UL}$.

The user equipment can perform frequency hopping of the sounding reference signal to transmit the sounding reference signal to all the uplink data transmission bandwidths. The frequency hopping is set by a parameter $b_{hop}$ having a value of 0 to 3 given by the upper layer.

If frequency hopping of the sounding reference signal is not activated, i.e., in case of $b_{hop} \geq B_{SRS}$, the frequency location index $n_b$ has a constant value as expressed by the following Equation 11. In the Equation 11, $n_{RRC}$ is a parameter given by the upper layer.

$$n_b = \lfloor 4n_{RRC}/m_{SRS,b} \rfloor \bmod N_b \quad \text{[Equation 11]}$$

Meanwhile, if frequency hopping of the sounding reference signal is activated, i.e., in case of $b_{hop} < B_{SRS}$ the frequency location index $n_b$ is defined by the following Equations 12 and 13.

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases} \quad \text{[Equation 12]}$$

$$F_b(n_{SRS}) = \begin{cases} (N_b/2) \left\lfloor \frac{n_{SRS} \bmod \prod_{b'=b_{hop}}^{b} N_{b'}}{\prod_{b'=b_{hop}}^{b-1} N_{b'}} \right\rfloor + \left\lfloor \frac{n_{SRS} \bmod \prod_{b'=b_{hop}}^{b} N_{b'}}{2 \prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases} \quad \text{[Equation 13]}$$

$n_{SRS}$ is a parameter that calculates the number of transmission times of the sounding reference signal and is defined by the following Equation 14.

[Equation 14]

$$n_{SRS} = \begin{cases} 2N_{SP}n_f + 2(N_{SP}-1)\left\lfloor \dfrac{n_s}{10} \right\rfloor + \left\lfloor \dfrac{T_{offset}}{T_{offset\_max}} \right\rfloor, & \text{for 2 ms } SRS \text{ periodicity} \\ & \text{of } TDD \text{ frame structure} \\ \lfloor (n_f \times 10 + \lfloor n_s/2 \rfloor)/T_{SRS} \rfloor, & \text{otherwise} \end{cases}$$

In the Equation 14, $T_{SRS}$ is a period of the sounding reference signal, and $T_{offset}$ denotes subframe offset of the sounding reference signal. Also, $n_s$ denotes a slot number, and $n_f$ denotes a frame number.

A user equipment specific sounding reference signal setup index $I_{SRS}$ for setting the period $T_{SRS}$ of the user equipment specific sounding reference signal and the subframe offset $T_{offset}$ is expressed as illustrated in the following Table 7-10 depending on FDD and TDD. In particular, Table 7 illustrates the user equipment specific sounding reference signal configuration index in case of the FDD, and Table 8 illustrates the user equipment specific sounding reference signal configuration index in case of the TDD. Tables 7 and 8 show periodicity and offset information with respect to triggering type 0, that is, the periodic SRS.

TABLE 7

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$ − 2 |
| 7-16 | 10 | $I_{SRS}$ − 7 |
| 17-36 | 20 | $I_{SRS}$ − 17 |
| 37-76 | 40 | $I_{SRS}$ − 37 |
| 77-156 | 80 | $I_{SRS}$ − 77 |
| 157-316 | 160 | $I_{SRS}$ − 157 |
| 317-636 | 320 | $I_{SRS}$ − 317 |
| 637-1023 | reserved | reserved |

TABLE 8

| Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$ − 10 |
| 15-24 | 10 | $I_{SRS}$ − 15 |
| 25-44 | 20 | $I_{SRS}$ − 25 |
| 45-84 | 40 | $I_{SRS}$ − 45 |
| 85-164 | 80 | $I_{SRS}$ − 85 |
| 165-324 | 160 | $I_{SRS}$ − 165 |
| 325-644 | 320 | $I_{SRS}$ − 325 |
| 645-1023 | reserved | reserved |

Figure 10:
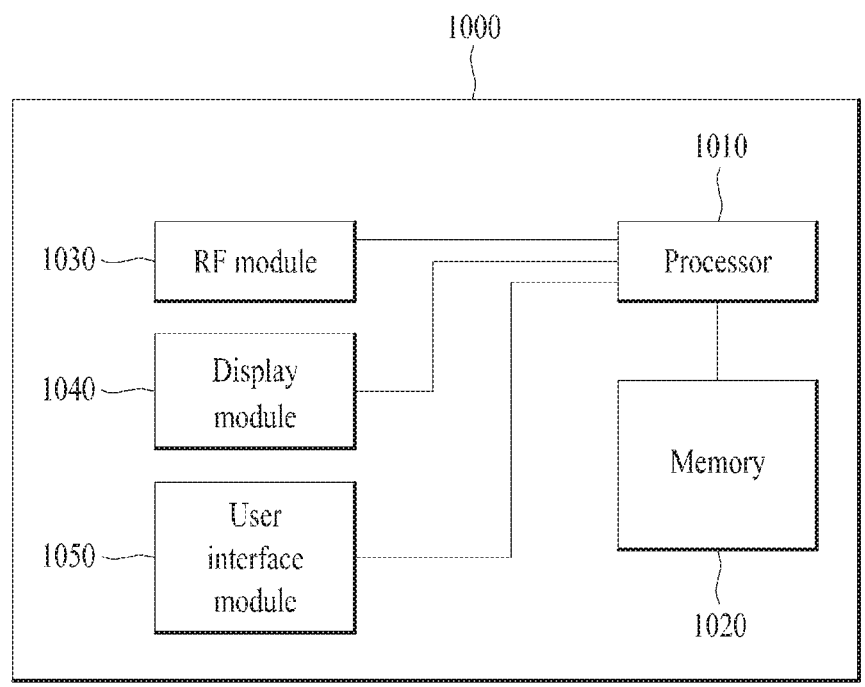
FIG. 10 is a block diagram for an example of a communication device according to one embodiment of the present invention.

Tables 9 and 10 show periodicity and offset information regarding triggering type 1, that is, the aperiodic SRS. Particularly, Table 9 shows the case of an FDD system and FIG. 10 shows the case of a TDD system.

TABLE 9

| SRS Configuration Index $I_{SRS}$ | SRS Periodicity $T_{SRS,\,1}$ (ms) | SRS Subframe Offset $T_{offset,\,1}$ |
|---|---|---|
| 0-1 | 2 | $I_{SRS}$ |
| 2-6 | 5 | $I_{SRS}$ − 2 |
| 7-16 | 10 | $I_{SRS}$ − 7 |
| 17-31 | reserved | reserved |

TABLE 10

| SRS Configuration Index $I_{SRS}$ | SRS Periodicity $T_{SRS,\,1}$ (ms) | SRS Subframe Offset $T_{offset,\,1}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$ − 10 |
| 15-24 | 10 | $I_{SRS}$ − 15 |
| 25-31 | reserved | reserved |

In recent wireless communication systems, there has been discussion of techniques for flexibly changing usage of resource for downlink or uplink when an eNB divides all available resources into downlink resources and uplink resources and performs duplex operation using the resources.

The aforementioned method for flexibly changing usage of resources has the advantage that optimized resource distribution can be performed when sizes of downlink traffic and uplink traffic are flexibly varied. For example, in operations of an FDD system using frequency bands divided into a downlink band and an uplink band, an eNB can designate a specific band to a downlink resource or an uplink resource at a specific time through an RRC, MAC or physical layer signal for flexible resource usage change.

Particularly, a TDD system partitions all subframes into uplink subframes and downlink subframes and uses the uplink subframes and downlink subframes for uplink transmission of UEs and downlink transmission of an eNB. Such resource partitioning can be provided as part of system information according to the uplink/downlink subframe configurations of Table 1. New uplink/downlink subframe configurations may be provided in addition to the uplink/downlink subframe configurations of Table 1. For flexible resource usage change in the TDD system, the eNB can designate a specific subframe to a downlink resource or an uplink resource at a specific time through an RRC, MAC or physical layer signal.

In LTE systems, a downlink resource and an uplink resource are designated through system information. Since the system information needs to be transmitted to a plurality of unspecified UEs, operations of legacy UEs may have problems when the system information is flexibly changed. Accordingly, it is desirable to transmit information on flexible resource usage change to UEs currently linked to an eNB through new signaling, particularly, UE-dedicated signaling, rather than the system information. Such new signaling may indicate a configuration of a flexibly changed resource, for example, uplink/downlink subframe configuration information different from that indicated through system information in a TDD system.

In addition, such new signaling may include information related to HARQ. Particularly, the new signaling may include a scheduling message and PDSCH/PUSCH transmission timing corresponding thereto, and HARQ timeline configuration information for maintaining stable HARQ timeline even if resource configuration is flexibly changed so as to solve a problem that HARQ timeline, defined as HARQ-ACK transmission timing, does not continue when the HARQ timeline is flexibly changed. In the case of a TDD system, the HARQ timeline configuration information can be provided as an uplink/downlink subframe configuration that is referred to when downlink HARQ timeline and/or uplink HARQ timeline are defined.

As described above, a UE linked to a system that flexibly changes usage of resources receives information about a resource configuration. In the case of TDD system, particularly, a UE can acquire the following information at a specific time.

1) Uplink/downlink subframe configuration indicated by system information

2) Uplink/downlink subframe configuration transmitted in order to indicate usage of each subframe through additional signaling 3) Uplink/downlink subframe configuration transmitted to define downlink HARQ timing, that is, when HARQ-ACK for a PDSCH received at a specific time will be transmitted 4) Uplink/downlink subframe configuration transmitted to define uplink HARQ timing, that is, when a PUSCH for an uplink grant received at a specific time will be transmitted and when a PHICH for a PUSCH transmitted at a specific time will be received When a specific UE is linked to an eNB that flexibly changes usage of resources, the eNB may operate to set an uplink/downlink subframe configuration including as many uplink subframes as possible through system information in many cases. This is because flexible change of subframes, which are designated as downlink subframes through the system information, to uplink subframes may be restricted. For example, since legacy UEs expect and measure CRS transmission in subframes, which are designated as downlink subframes through system information, all the time, serious error can be generated in CRS measurement of the legacy UEs when the downlink subframes are flexibly changed to uplink subframes. Accordingly, it is desirable that the eNB flexibly change some uplink subframes to downlink subframes when downlink traffic increases while configuring a larger number of uplink subframe on the system information.

In a TDD system operating according to the aforementioned principle, although uplink/downlink subframe configuration #0 is signaled to a UE through system information at a specific time, usage of resources in each subframe may conform to uplink/downlink subframe configuration #1.

Downlink HARQ timing may be based on uplink/downlink subframe configuration #2. This is because HARQ timing can be maintained even if uplink/downlink subframe configurations are flexibly changed when HARQ timing is based on an uplink/downlink subframe configuration including a smaller number of uplink subframes and a larger number of downlink subframes such that the number of downlink subframes reaches a maximum number to cause a situation in which HARQ-ACK is difficult to transmit and downlink HARQ timing is operated in this situation. Similarly, uplink HARQ timing may be based on an uplink/downlink subframe configuration including a larger number of uplink subframes, such as uplink/downlink subframe configuration #0.

As described above, uplink transmission power control of a UE includes open loop power control (OLPC) and closed loop power control (CLPC). The former controls power in such a manner that attenuation of a downlink signal from an eNB of a cell to which the UE belongs is estimated and compensated for. For example, OLPC controls uplink power by increasing uplink transmission power when downlink signal attenuation increases as a distance between the UE and the eNB increases. The latter controls uplink power in such a manner that the eNB directly transmits information (i.e. a control signal) necessary to control uplink transmission power.

However, these conventional uplink power control methods do not consider a UE linked to an eNB that flexibly changes usage of resources. When the conventional power control methods are used although specific uplink transmission is carried out in an uplink subframe to which flexible resource usage change is applied, uplink transmission performance may be seriously deteriorated since interference environments are remarkably changed due to downlink transmission of a neighboring cell and the like.

For such a reason, LTE discusses a method of designating a plurality of subframe sets and applying different power control methods to respective subframe sets. Information on the plurality of subframe sets may be provided to UEs through higher layer signaling such as RRC signaling. Particularly, the information may be provided in connection with information on subframe sets used for other purposes or independently RRC-signaled.

For convenience of description, it is assumed that two subframe sets are signaled. The subframes are respectively referred to as subframe set #1 and subframe set #2 in the following. Subframe set #1 and subframe set #2 can be defined as L-bit subframe bitmaps. Particularly, subframe set #1 and subframe set #2 can respectively correspond to static subframes and flexible subframes.

Figure 8:
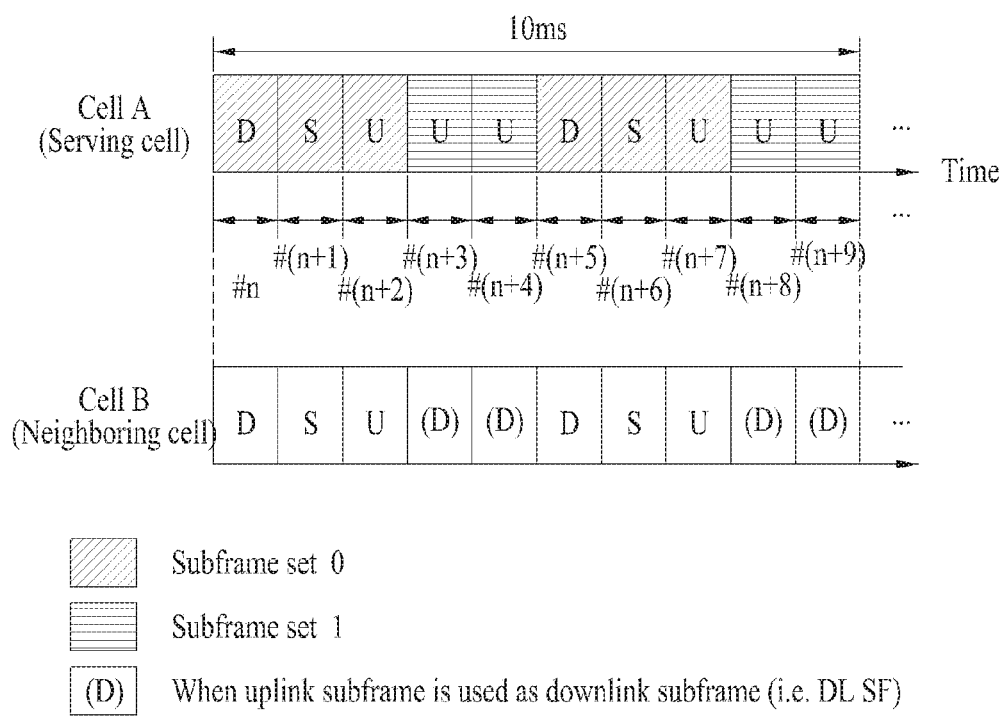
FIG. 8 illustrates an example of dividing one radio frame into subframe set #1 and subframe set #2.

FIG. 8 illustrates one radio frame divided into subframe set #1 and subframe set #2.

Referring to FIG. 8, a static subframe can refer to a conventional subframe to which flexible resource usage change is not applied. A flexible subframe can refer to a subframe to which flexible resource usage change is applied or can be applied. That is, an interference environment during uplink transmission of a UE may be remarkably varied in the flexible subframe, differently from the static subframe, and thus it is preferable to apply a separate uplink power control method to the flexible subframe.

FIG. 8 illustrates a case in which cell B (neighboring cell) changes subframes #(n+3), #(n+4), #(n+8) and #(n+9) to downlink subframes in a state in which cell A (serving cell) and cell B set uplink/downlink subframe configuration #0 (that is, DSUUUDSUUU) through system information.

In this case, cell A can configure subframe set #1 and subframe set #2 for UEs belonging thereto, as shown in FIG. 8, and allow the UEs to apply different power control methods to the subframe sets. That is, if inter-cell coordination is possible, when a specific cell flexibly changes usage of resources, neighboring cells can appropriately configure subframe sets in consideration of flexible resource usage change of the specific cell. Alternatively, it is predetermined that only predetermined subframe set configurations are applied between cells such that flexible resource usage change can be applied to a specific subframe set (e.g. subframe set #2 in FIG. 8) only.

Specifically, when a conventional PUSCH PC in a specific subframe set (e.g. subframe set #1 which corresponds to flexible subframes) is applied to another specific subframe set (e.g. subframe set #1 which is a static subframe), performance deterioration may occur due to a large interference difference between the subframe sets. Accordingly, it is desirable to respectively apply separate PUSCH power control processes to the subframe sets.

The present invention sets a plurality of SRS power control processes, similarly to setting a plurality of PUSCH power control processes for a specific UE. Particularly, the present invention can establish a relationship between a specific SRS power control process and a specific PUSCH power control process.

For example, PUSCH power control process #1 can be associated with SRS power control process #1 and PUSCH power control process #2 can be associated with SRS power control process #2. Here, linkage may mean that at least one of parameters $\{P_{CMAX,c}(i) \ P_{SRS\_OFFSET,c}(m), \ M_{SRS,c}$ $P_{O\_PUSCH,c}(j), \ \alpha_c(j), \ PL_c, \ f_c(i)\}$ related to an SRS power control process is identical to the corresponding parameter of a PUSCH power control process associated with the SRS power control process or is determined in association with the corresponding parameter according to a specific function. Specifically, $\{P_{O\_PUSCH,c}(j), \ \alpha_c(j), \ PL_c, \ f_c(i)\}$ can be set to be identical to corresponding parameters of the corresponding PUSCH power control process. $P_{SRS\_OFFSET,c}(m)$ may be set as an independent value for each SRS power control process or set as a common value for some SRS power control processes.

Each SRS power control process may be set to triggering type 0, that is, periodic SRS (P-SRS) or triggering type 1, that is, aperiodic SRS (A-SRS). While a plurality of A-SRS configurations may be present according to triggering bit, periodicity $T_{SRS,1}$ and subframe offset $T_{offset,1}$ of an A-SRS can be designated to be commonly applied to all A-SRS configurations. A subframe set defined by periodicity $T_{SRS,1}$ and subframe offset $T_{offset,1}$ of the A-SRS is referred to as an A-SRS subframe set.

The present invention additionally considers a scheme in which A-SRS subframe set information is independently set for each A-SRS configuration as well as a scheme in which the A-SRS subframe set is commonly provided for all A-SRS configurations through RRC signaling, and provides a method for UE operation regarding triggering of A-SRS transmission according to an SRS power control process.

The present invention assumes a case in which a UE receives information on specific power control subframe sets, such as subframe set #1 (e.g. "static subframes") and subframe set #2 (e.g. "flexible subframes"), through higher layer signaling. Such power control subframe set information and the aforementioned A-SRS subframe set information may be provided as separate pieces of information or the power control subframe sets may be associated with A-SRS subframe sets in such a manner that power control subframe set #1 corresponds to A-SRS subframe set #0 and power control subframe set #2 corresponds to A-SRS subframe set #1.

While two power control subframe sets #1 and #2 are configured for the UE in the following description, three or more power control subframe sets may be configured in the present invention. In addition, while the two power control subframe sets may respectively correspond to static subframes and flexible subframes, this is exemplary and thus each power control subframe set may be set to an arbitrary independent subframe set through RRC and the UE can perform uplink transmission (e.g. PUSCH transmission) in a power control subframe set according to an uplink power control process corresponding thereto.

In addition, power control subframe set #1 can be set to static subframes which are uplink subframes all the time. On the other hand, power control subframe set #2 can be set to subframes including not only subframes, which are designated as downlink subframes through system information but may be flexibly changed to uplink subframes, but also latent flexible subframes, which are designated as uplink subframes through the system information but reconfigured as downlink subframes through higher layer signaling or physical layer signaling and then changed to uplink subframes according to reconfiguration information.

Embodiments to which the present invention is applied will now be described in detail.

<First Embodiment>

In the first embodiment of the present invention, A-SRS subframe set information is commonly provided for all A-SRS configurations. Particularly, A-SRS transmission is performed according to the following method 1) or method 2) in the first embodiment of the present invention.

Method 1)—Implicit Signaling

When an A-SRS triggering message is received in an n-th subframe, the corresponding A-SRS is transmitted in an m-th subframe initially belonging to an A-SRS subframe set after an (n+k)-th subframe (e.g. (n+4)-th subframe). A-SRS transmission power is determined using a power control process applied to power control subframe set #1 or power control subframe set #2, to which the m-th subframe belongs, and the A-SRS is transmitted with the transmission power.

Here, A-SRS power control processes respectively pre-associated with power control subframe set #1 and power control subframe set #2 may be signaled through an RRC layer. Alternatively, power control processes respectively pre-associated with power control subframe set #1 and power control subframe set #2 may be signaled in such a manner that only information on a specific PUSCH power control process is provided through the RRC layer and information on additional association of a specific A-SRS power control process and each PUSCH power control process is provided to define the A-SRS power control process.

That is, an A-SRS power control process associated with a PUSCH power control process corresponding to the power control subframe set to which the m-th subframe belongs is applied.

Method 2)—Explicit Signaling

Distinguished from method 1), power control parameters or a power control process index applied per A-SRS triggering field may be set through RRC signaling. For example, at least one of $\{P_{CMAX,c}(i), P_{SRS\_OFFSET,c}(m), P_{O\_PUSCH,c}(j), \alpha_c(j)\}$ can be set per A-SRS triggering field. In this case, the at least one parameter can be set in such a manner that the parameter is associated with a related parameter of a specific PUSCH power control process.

In addition, with respect to TPC $f_c(i)$, a common single TPC accumulation process can be applied to all power control processes. In this case, $f_c(i)$ is applied to determine corresponding A-SRS transmission power according to the corresponding single TPC command. If multiple TPC parameters are respectively present for specific power control processes, a TPC parameter applied per A-SRS triggering field may be set through RRC signaling.

As described above, since power control parameters or a power control process index are explicitly set per A-SRS triggering field, when the A-SRS triggering message is received in the n-th subframe, the corresponding A-SRS is transmitted in the m-th subframe initially belonging to the A-SRS subframe set after the (n+k)-th subframe (e.g. (n+4)-th subframe).

Such explicit association signaling can be defined as shown in Table 11. Table 11 shows an A-SRS triggering field having 2 bits.

TABLE 11

| Value of SRS request field | Description |
| --- | --- |
| '00' | No type 1 SRS trigger |
| '01' | The 1$^{st}$ SRS parameter set configured by higher layers and PC parameters used for PUSCH in the subframe (on which the SRS triggered by this DCI is transmitted) |
| '10' | The 2$^{nd}$ SRS parameter set and PC parameter set 1 configured by higher layers |
| '11' | The 3$^{rd}$ SRS parameter set and PC parameter set 2 configured by higher layers |

Fields values "10" and "11" of Table 11 respectively describe power control parameter set #1 (i.e. power control subframe set #1) and power control parameter set #2 (i.e. power control subframe set #2). Field value "01" describes implicit signaling of method 1). While Table 11 shows the 2-bit triggering field, signaling can be normalized and extended in a similar form even in the case of a triggering field of 3 or more bits.

In DCI having a 1-bit triggering field, field values and attributes thereof can be defined as shown in Table 12 or 13.

TABLE 12

| Value of SRS request field | Description |
| --- | --- |
| '0' | No type 1 SRS trigger |
| '1' | The 1$^{st}$ SRS parameter set configured by higher layers and PC parameters used for PUSCH in the subframe (on which the SRS triggered by this DCI is transmitted) |

TABLE 13

| Value of SRS request field | Description |
| --- | --- |
| '0' | No type 1 SRS trigger |
| '1' | The 2$^{nd}$ SRS parameter set and PC parameter set 1 configured by higher layers |

Tables 12 and 13 show two different embodiments. That is, field value "0" indicates "no type 1 SRS trigger", that is, no A-SRS transmission, and only field value "1" can be configured by RRC, and thus RRC configuration is provided such that A-SRS transmission is performed according to method 1 in Table 10. In this case, when a UE receives field value "1" through the corresponding DCI, the UE determines transmission power using a PUSCH power control process or a power control parameter corresponding to the power control subframe set to which a subframe in which the corresponding A-SRS is transmitted belongs and transmits the A-SRS with the transmission power.

When the UE receives field value "1" of FIG. 13, the UE determines A-SRS transmission power using power control parameter set #1 (or power control subframe set #1) all the time irrespective of the power control subframe set to which the subframe in which the corresponding A-SRS is transmitted belongs and transmits the A-SRS with the determined transmission power. In FIG. 13, power control parameter set #2 may be provided as an RRC configuration for field value "1".

Alternatively, field value "1" may be defined to conform to a specific field value of a triggering field of two or more bits, as shown in Table 11. For example, field value "01" of Table 11 is automatically defined as RRC configuration of field value "1". Here, the relationship between DCI having a 1-bit A-SRS triggering field and DCI having an A-SRS triggering field having two or more bits can be predefined or provided through RRC signaling.

When multiple pieces of DCI having an N-bit SRS triggering field are present, the information of Tables 11, 12 and 13 may be RRC-signaled such that the information is commonly used for the DCI or separate information may be independently RRC-signaled per DCI. Alternatively, multiple tables with respect to the relationship between an SRS triggering field and a power control process, such as Tables 11, 12 and 13, are established and a corresponding table is applied according to whether DCI is detected from a UE-specific search space or a common search space and whether the DCI is detected from a normal PDPCCH or through an enhanced PDCCH (EPDCCH) received through a data region.

The UE may be configured to determine A-SRS transmission power using only a power control parameter set corresponding to the lowest (or highest) index all the time and to transmit the A-SRS with the power, instead of being RRC-signaled RRC configuration for a specific field value (e.g. field value "1") as shown in Tables 12 and 13. For example, if the UE is configured to use the power control parameter set corresponding to the lowest index while indices of 0 to N are assigned to power control parameter sets, the UE can operate to determine A-SRS transmission power according to power control parameter set #1 and to transmit the A-SRS with the transmission power when a specific field value is dynamically triggered. Accordingly, RRC signaling overhead can be reduced. This is because, when an eNB intends to configure a specific power control parameter set, A-SRS transmission power can be determined through dynamic signaling according to a corresponding field value by setting/re-setting the specific power control parameter set to the lowest (or highest) index all the time.

<Second Embodiment>

In the second embodiment of the present invention, A-SRS subframe set information is independently provided per A-SRS configuration. Particularly, A-SRS transmission is performed according to the following method 3 or method 4 in the second embodiment of the present invention.

Method 3)—Implicit Signaling

When an A-SRS triggering field is received in the n-th subframe, the corresponding A-SRS is transmitted in the m-th subframe initially belonging to an A-SRS subframe set which is separately set to the corresponding A-SRS triggering field after the (n+k)-th subframe (e.g. (n+4)-th subframe). A-SRS transmission power is determined using a power control process applied to power control subframe set #1 or power control subframe set #2, to which the m-th subframe belongs and the A-SRS is transmitted with the transmission power.

Here, A-SRS power control processes respectively pre-associated with power control subframe set #1 and power control subframe set #2 may be signaled through an RRC layer. Alternatively, power control processes respectively pre-associated with power control subframe set #1 and power control subframe set #2 may be signaled in such a manner that only information on a specific PUSCH power control process is provided through the RRC layer and information on additional association of a specific A-SRS power control process and each PUSCH power control process is provided to define the A-SRS power control process. An A-SRS power control process associated with a PUSCH power control process corresponding to the power control subframe set to which the m-th subframe belongs is applied.

Method 4)—Explicit Signaling

Distinguished from method 1), an A-SRS subframe set and power control parameters (or a power control process index) applied per A-SRS triggering field may be set through RRC signaling. For example, at least one of $\{P_{CMAX,c}(i), P_{SRS\_OFFSET,c}(m), P_{O\_PUSCH,c}(j), \alpha_c(j)\}$ can be set per A-SRS triggering field. In this case, the at least one parameter can be set in such a manner that the parameter is associated with a related parameter of a specific PUSCH power control process. In addition, with respect to TPC $f_c(i)$, a common single TPC accumulation process can be applied to all power control processes. In this case, $f_c(i)$ is applied to determine corresponding A-SRS transmission power according to the corresponding single TPC command. If multiple TPC parameters are respectively present for specific power control processes, a TPC parameter applied per A-SRS triggering field may be set through RRC signaling.

As described above, since power control parameters or a power control process index are explicitly set per A-SRS triggering field, when the A-SRS triggering message is received in the n-th subframe, the corresponding A-SRS is transmitted in the m-th subframe initially belonging to an A-SRS subframe set, which is separately set to the triggering field of the A-SRS, after the (n+k)-th subframe (e.g. (n+4)-th subframe).

In addition to the aforementioned methods, when an A-SRS triggering message is received in the n-th subframe irrespective of A-SRS subframe configuration (or in a specific situation such as a case in which no A-SRS subframe configuration is present), the corresponding A-SRS is transmitted in a designated (n+k')-th subframe (here, k' is 4 or is predefined or designated through dynamic signaling or semi-static signaling) all the time using a power control process applied to power control subframe set #1 or power control subframe set #2, to which the (n+k)'-th subframe belongs.

A-SRS power control processes respectively pre-associated with power control subframe set #1 and power control subframe set #2 may be signaled through RRC. Alternatively, power control processes respectively pre-associated with power control subframe set #1 and power control subframe set #2 may be defined in such a manner that only information on a specific PUSCH power control process is provided through RRC and information on additional association of a specific A-SRS power control process and each PUSCH power control process is provided to defined the A-SRS power control process. That is, an A-SRS power control process associated with a PUSCH power control process corresponding to the power control subframe set to which the (n+k')-th subframe belongs is applied.

Alternatively, when an A-SRS is triggered in the n-th subframe irrespective of A-SRS subframe configuration (or in a specific situation such as a case in which no A-SRS subframe configuration is present), the A-SRS can be transmitted in an m-th subframe initially belonging to power control subframe set #p (p=1, 2, . . . , the value of p being specified according to RRC configuration or fixed to a specific value) after the (n+k)-th subframe and SRS power can be determined according to a power control process corresponding to power control subframe set #p. Here, RRC configuration for a power control subframe set number, such as p, may be set per A-SRS triggering field and/or per specific DCI, or may be commonly applied to all A-SRSs.

The A-SRS power control processes pre-associated with power control subframe set #1 and power control subframe set #2 may be signaled through RRC. Alternatively, power control processes pre-associated with power control subframe set #1 and power control subframe set #2 may be signaled in such a manner that only information on a specific PUSCH power control process is provided through RRC signaling and information on additional association of a specific A-SRS power control process and each PUSCH power control process is provided to define the specific A-SRS power control process. That is, an A-SRS power control process associated with a PUSCH power control process corresponding to the power control subframe set to which the (n+k)-th subframe belongs is applied.

Alternatively, when an A-SRS is triggered in the n-th subframe irrespective of A-SRS subframe configuration (or in a specific situation such as a case in which no A-SRS subframe configuration is present), the A-SRS can be transmitted in then m-th subframe belonging to power control subframe set #q (q can be automatically determined from among indices 1, 2, . . . according to a power control subframe set which initially appears after the (n+k)-th subframe) which initially appears after the (n+k)-th subframe (e.g. (n+4)-th subframe) and SRS power can be determined according to a power control process corresponding to power control subframe set #q. That is, q is determined based on a power control subframe set which initially appears after the (n+k)-th subframe, rather than being fixed, and thus q can be varied according to A-SRS triggering time.

In the case of DCI including a 1-bit A-SRS triggering field, the A-SRS triggering field can have only one field value (e.g. field value "1" indicating A-SRS triggering) and thus an implicit method such as method 1 is preferably used.

Alternatively, an independent operation such as method 3 or method 4 may be performed for each A-SRS triggering field present per DCI. That is, method 3 or method 4 may be applied per A-SRS triggering field in specific DCI or applied for different pieces of DCI.

Furthermore, it is possible to consider a method for improving SRS transmission power flexibility of a network by simultaneously applying method 3 or method 4 to different pieces of DCI and to DCI having multiple triggering fields.

According to the aforementioned methods, it is possible to achieve stable SRS reception by applying SRS transmission power control per subframe in an environment in which subframes may have different inter-cell interference levels, such as an environment to which the aforementioned flexible resource usage change is applied.

The above-described A-SRS related transmission power control can also be applied to a periodic SRS, that is, P-SRS, which will be described as a separate embodiment.

<Third Embodiment>

In the third embodiment of the present invention, it is assumed that an eNB provides a plurality of P-SRS configurations to a UE through RRC signaling.

In the third embodiment of the present invention, each P-SRS configuration is associated with a specific power control process and the associated power control process uses parameters identical to at least one of parameters such as $\{P_{O\_PUSCH,c}(j), \alpha_c(j), PL_c, f_c(i)\}$ or partially changes finally applied values according to a specific function while using the parameters. Each P-SRS configuration may be set to conform to an independent power control process.

That is, power control parameter set #1 (i.e. power control subframe set #1) and power control parameter set #2 (i.e. power control subframe set #2) are selectively associated with a P-SRS configuration such that the UE can operate to determine P-SRS transmission power using power control parameter set #p for a PUSCH all the time and to transmit the corresponding P-SRS using the transmission power when only one P-SRS configuration is set for the UE.

Here, power control parameter set #p for a PUSCH may be a power control parameter set having the lowest (or highest) index and may be used to determine P-SRS transmission power and to transmit the corresponding P-SRS. For example, when indices of 0 to N are respectively assigned to power control parameter sets and the power control parameter set having the lowest index is determined to be used all the time, P-SRS transmission power can be determined using power control parameter set #1 and the corresponding P-SRS can be transmitted with the transmission power. In this case, the quantity of RRC signaling information for the corresponding P-SRS configuration can be reduced.

The UE may operate to use power control parameter set #1 corresponding to power control subframe set #1 for a PUSCH in a specific subframe and to use power control parameter set #2 corresponding to power control subframe set #2 for an SRS in the same subframe.

A specific power control process (e.g. a specific power control subframe set and power control related parameters) that can be associated with each P-SRS configuration and/or other parameters can be set to independent values per P-SRS configuration. Here, P-SRS periodicity $T_{SRS}$ may not be a cell-specific parameter. That is, $T_{SRS}$ may be a UE-specific parameter and may be set to different values for respective P-SRS configurations. When two or more P-SRS configurations having different periodicities and/or offsets are set, UE operation in a case in which P-SRS transmission timings according to two or more P-SRS configurations overlap in a specific subframe may be determined to conform to at least one of the following methods or the corresponding method may be set through RRC signaling.

a) A P-SRS, to which parameters according to a P-SRS configuration having the longest periodicity and/or a power control process corresponding to the P-SRS configuration are applied, is transmitted and P-SRS transmissions according to other P-SRS configurations are ignored (that is, dropped). This method has the advantage that SRS transmissions according to various P-SRS configurations can be uniformly performed by providing highest transmission priority to the P-SRS having the longest periodicity such that P-SRSs having shorter periodicities are dropped and then transmitted at the next transmission timing.

b) On the assumption that indices are respectively assigned to P-SRS configurations, a P-SRS, to which parameters according to a P-SRS configuration having the lowest (or highest) index and/or a power control process corresponding to the P-SRS configuration are applied, is transmitted and P-SRS transmissions according to other P-S configurations are dropped.

c) A P-SRS, to which parameters of a specific P-SRS configuration associated with a power control subframe set corresponding to a current subframe and/or a power control process corresponding to the specific P-SRS configuration are applied, is transmitted and P-SRS transmissions according to other P-SRS configurations are dropped. SRS transmission can be performed according to whether the current subframe is a static subframe or a flexible subframe using this method.

d) A P-SRS, to which parameters of a specific P-SRS configuration associated with a predefined (or set through RRC signaling) specific power control subframe set (e.g., power control subframe set corresponding to a static subframe) and/or a power control process corresponding to the specific P-SRS configuration are applied, is transmitted all the time and P-SRS transmissions according to other P-SRS configurations are dropped.

e) All P-SRS transmissions in a corresponding subframe may be dropped. However, when even an A-SRS needs to be transmitted in the corresponding subframe, it is desirable to transmit the A-SRS.

Obviously, methods a to e can be combined and applied. In this case, priority of application of the methods can be defined. For example, methods a and b can both be applied. This scheme may be implemented in such a manner that the method a is applied first, when multiple P-SRS configurations have the same longest periodicity, only an SRS according to a P-SRS configuration having a lower (or higher) index from among the P-SRS configurations is transmitted and other P-SRSs are dropped.

Alternatively, the methods c and b can be applied. When the method c is applied first, this scheme may be implemented in such a manner that, when two or more P-SRS configurations are associated with a specific power control subframe set to which a current subframe belongs, only an SRS according to a P-SRS configuration having a lower (or higher) index from among the P-SRS configurations is transmitted and other P-SRSs are dropped.

Alternatively, operation may be performed in the order of a c→a→b. That is, when two or more P-SRS configurations having the longest periodicity are selected, an SRS according to a P-SRS configuration associated with a specific power control subframe set to which a current subframe belongs is transmitted. If multiple P-SRS configurations are associated with the specific power control subframe set to which the current subframe belongs, an SRS according to a P-SRS configuration having the lowest (or highest) index from among the multiple P-SRS configurations is transmitted.

Alternatively, application priority may be determined in the order of c→a→b. In this case, a power control subframe set to which a current subframe belongs is checked for the first time. When two or more P-SRS configurations are associated with the power control subframe set to which the current subframe belongs, a P-SRS configuration having a longer periodicity is detected from the two or more P-SRS configurations. When two or more P-SRS configurations have longer periodicities, an SRS according to a P-SRS configuration having the lowest (or highest) index is transmitted.

<Fourth Embodiment>

It is assumed that an eNB provides one P-SRS configuration to a UE through RRC signaling in the fourth embodiment of the present invention.

The eNB can enable the UE to transmit a P-SRS according to specific SRS configuration parameters previously associated with a power control subframe set to which a subframe in which SRS transmission is performed according to the corresponding P-SRS configuration belongs and/or the corresponding power control process. That is, the eNB can enable the UE to perform SRS transmission according to SRS related power control parameters and/or transmission power control depending on whether the current SRS transmission subframe according to the corresponding P-SRS configuration is a static subframe or a flexible subframe.

According to this method, at least one of the SRS related power control parameters $\{P_{CMAX,c}(i), P_{SRS\_OFFSET,c}(m), M_{SRS,c}, P_{O\_PUSCH,c}(j), \alpha_c(j), PL_c, f_c(i)\}$ can be varied according to the type of the SRS transmission subframe.

For example, a P-SRS can be transmitted using parameters identical to at least one of parameters associated with a power control subframe set to which a current subframe belongs, such as $\{P_{O\_PUSCH,c}(j), \alpha_c(j), PL_c(i)\}$, or by partially changing finally applied values according to a specific function while using the parameter.

Information to be used for power control for P-SRS configurations can be provided in one of the following forms through RRC signaling.

i) Power control parameters related to a PUSCH in a subframe in which a P-SRS is transmitted ii) Power control parameter set #1 (i.e. power control subframe set #1)

iii) Power control parameter set #2 (i.e. power control subframe set #2)

If two or more power control parameter sets can be configured, an option such as power control parameter set #3 can be added.

It is obvious that basic restrictions can be imposed on the above embodiments such that a subframe in which an SRS is transmitted is used to transmit the SRS only when the subframe is an uplink subframe (and/or a special subframe) according to flexible resource usage change.

In addition, it is obvious that basic restrictions can be imposed on the above embodiments such that a subframe in which an SRS is transmitted is used to transmit the SRS only when the subframe is an uplink subframe or a special subframe according to flexible resource usage change. That is, power control subframe sets can include a special subframe and can be designated/configured to include a combination of a special subframe and a normal uplink subframe.

Particularly, while the special subframe includes UpPTS for uplink transmission, a PUSCH is not transmitted and only an SRS can be transmitted in the UpPTS.

However, when a subframe for SRS transmission is a special subframe, a power control parameter set for a PUSCH is present although the PUSCH cannot be transmitted in the special subframe in the present invention. Accordingly, a UE can determine SRS transmission power using the power control parameter set for the PUSCH.

<Fifth Embodiment>

While a minimum P-SRS periodicity in a TDD system is 2 ms as shown in Table 8, the minimum P-SRS periodicity is 1 ms, as shown in Table 14, in the fifth embodiment of the present invention for more flexible utilization of P-SRS configuration.

$T_{offset}$, a factor that determines SRS transmission timing, can be set to a larger number of values, as shown in Table 14, as compared to a case in which the minimum periodicity is 2 ms. Table 14 is exemplary and modifications for improving P-SRS configuration flexibility are included in the scope of the present invention.

TABLE 14

| SRS Configuration Index $I_{SRS}$ | SRS Periodicity $T_{SRS}$ (ms) | SRS Subframe Offset $T_{offset}$ |
|---|---|---|
| Reference_Index + 0 | 1 | 0, 1, 2 |
| Reference_Index + 1 | 1 | 0, 1, 3 |

TABLE 14-continued

| SRS Configuration Index $I_{SRS}$ | SRS Periodicity $T_{SRS}$ (ms) | SRS Subframe Offset $T_{offset}$ |
|---|---|---|
| Reference_Index + 2 | 1 | 0, 1, 4 |
| Reference_Index + 3 | 1 | 0, 2, 3 |
| Reference_Index + 4 | 1 | 0, 2, 4 |
| Reference_Index + 5 | 1 | 0, 3, 4 |
| Reference_Index + 6 | 1 | 1, 2, 3 |
| Reference_Index + 7 | 1 | 1, 2, 4 |
| Reference_Index + 8 | 1 | 1, 3, 4 |
| Reference_Index + 9 | 1 | 2, 3, 4 |
| Reference_Index + 10 | 1 | 0, 1, 2, 3 |
| Reference_Index + 11 | 1 | 0, 1, 2, 4 |
| Reference_Index + 12 | 1 | 0, 1, 3, 4 |
| Reference_Index + 13 | 1 | 0, 2, 3, 4 |
| Reference_Index + 14 | 1 | 1, 2, 3, 4 |

As an example of network operation, the present embodiment can be used to allow an eNB to detect an approximate reception power level through P-SRS transmission according to different P-SRS configurations when two or more P-SRSs (e.g. P-SRS configurations for PUSCH scheduling in a static subframe or a flexible subframe) to which different SRS power control processes according to a plurality of P-SRS configurations are applied are configured to be periodically transmitted.

When the eNB detects that reception sensitivity of an SRS to which a specific P-SRS configuration is applied increases or decreases from an average estimate to a specific level or more (or for more accurate frequency selective scheduling), the eNB can trigger an A-SRS that conforms to a specific power control process such that a UE can aperiodically transmit the A-SRS at the request of the eNB. This method can enable smooth frequency selective scheduling and link adaptation even in a situation in which flexible resource usage change occurs.

<Sixth Embodiment>

When a PUSCH needs to be transmitted in a subframe in which an SRS is transmitted, a UE can be configured to transmit both the PUSCH and the SRS in the same subframe. In this case, the UE operates according to at least one of the following methods or the conrresponding method is set through RRC signaling when different power control processes are applied to the PUSCH and SRS or a transmission power difference between the PUSCH and the SRS corresponds to a specific level or more due to a large transmission power offset value and the like.

A) When a transmission power difference between a PUSCH and an SRS to be transmitted in the corresponding subframe is larger than a predetermined value or a value provided through RRC signaling, the UE transmits only one of the PUSCH and the SRS and drops the other. When it is necessary to transmit only the PUSCH that is data information without uplink control information, the UE can drop the PUSCH and transmit only the SRS. When the PUSCH needs to be transmitted with the uplink control information, for example, when a PUCCH is piggybacked on the PUSCH, the UE can drop the SRS and transmit only the PUSCH.

B) When a PUCCH and an SRS need to be simultaneously transmitted in a specific subframe and a transmission power difference between the PUCCH and the SRS is larger than a predetermined value or a value provided through RRC signaling, the UE transmits only one of the PUCCH and the SRS and drops the other.

C) When a PUSCH, a PUCCH and an SRS need to be simultaneously transmitted in a specific subframe and a transmission power difference between the PUCCH or PUCCH and the SRS is larger than a predetermined value or a value provided through RRC signaling, the UE drops transmission of the SRS (or the PUSCH and PUCCH) and transmits the PUSCH and PUCCH together (or the SRS alone).

D) The UE transmits the SRS and drops other uplink transmissions or performs other uplink transmissions and drops the SRS only when an SRS is associated with a specific power control subframe set (e.g., a static subframe).

In methods A) to D), the UE may be configured to report the corresponding transmission power difference value (and/or information on dropping) to the eNB. The transmission power difference value report may be defined to be included in the PUSCH transmitted in the corresponding subframe (or transmitted according to the following initial uplink grant) through a specific format in the data payload of the PUSCH and transmitted. Otherwise, the transmission power difference value may be included in a PUSCH power headroom report (PHR) or reported therewith when a corresponding event is generated. Alternatively, the transmission power difference value may be reported through an additional uplink transmission format, and such report can be periodically performed or aperiodically performed upon generation of a corresponding event.

<Seventh Embodiment>

The seventh embodiment of the present invention describes a method of determining $N_{symb}^{PUSCH}$ (or $N_{symb}^{PUSCH-initial}$), which indicates the number of symbols to which a PUSCH is mapped, when a UE attempts to transmit the PUSCH.

Figure 9:
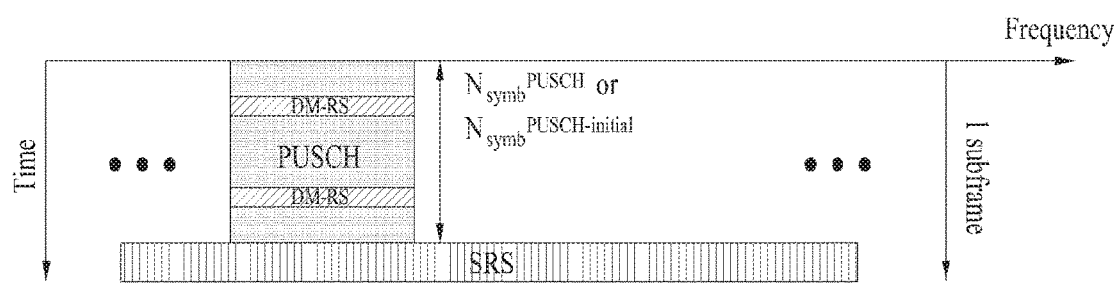
FIG. 9 illustrates a method of determining the number of symbols to which a PUSCH is mapped.

Referring to FIG. 9, determination of $N_{symb}^{PUSCH}$ is affected by a value NSRS according to cell-specific SRS configuration. When a current subframe in which the UE attempts to transmit the PUSCH corresponds to a subframe in which an SRS can be cell-specifically transmitted, NSRS can be set to 1. Here, the subframe in which the SRS can be cell-specifically transmitted can be provided through RRC signaling corresponding to higher layer signaling.

That is, one cell-specific SRS configuration is signaled to UEs within the corresponding cell, and each UE in the cell checks whether a PUSCH transmission subframe corresponds to the cell-specific SRS subframe when attempting to transmit a PUSCH and applies rate matching such that PUSCH data is not mapped to the last symbol (i.e. symbol on which the SRS can be transmitted) of the corresponding subframe when the PUSCH transmission subframe corresponds to the cell-specific SRS subframe. Since a PUSCH transmitted from a UE is generally sent to an eNB of a serving cell, the serving cell eNB operates on the basis of only one cell-specific SRS configuration.

However, when a plurality of P-SRS configurations is applied to a specific UE, as in the present invention, the cell-specific SRS subframe configuration is applied to the plurality of P-SRS configurations per UE and thus the number of subframes indicated by the cell-specific SRS subframe configuration may excessively increase. That is, as the number of subframes included in the cell-specific SRS subframe configuration increases, rate matching of the last SC-FDMA symbol during PUSCH transmission becomes frequent and thus throughput may be reduced. To solve this, the seventh embodiment of the present invention sets an SRS subframe configuration UE-specifically instead of cell-specifically and sets a plurality of UE-specific SRS subframe configurations for a specific UE.

That is, a plurality of UE-specific SRS subframe configurations can be signaled to a UE through UE-specific RRC signaling and the UE can determine a UE-specific SRS subframe configuration to be used for PUSCH rate matching when transmitting a PUSCH according to an uplink grant, from among the plurality of UE-specific SRS subframe configurations, through the following methods (X) and (Y).

(X) PUSCH rate matching is performed in subframes obtained through union of the plurality of UE-specific SRS subframe configurations RRC-signaled to the UE.

(Y) A UE-specific SRS subframe configuration related to subframes in which PUSCH rate matching will be performed is flexibly indicated through specific DCI in a corresponding uplink grant. Here, the method (X) may also be applied. That is, the UE can be flexibly instructed to perform PUSCH rate matching in subframes obtained through union of all or part of the plurality of UE-specific SRS subframe configurations RRC-signaled to the UE. Union of some SRS subframe configurations may be preset through RRC signaling as a configuration for a specific field of the corresponding DCI.

In addition, when the eNB signals a plurality of UE-specific SRS subframe configurations to a specific UE through RRC signaling, restrictions may be imposed such that subframes obtained through union of the UE-specific SRS subframe configurations are included in subframe sets indicated in cell-specific SRS subframe configurations applied to legacy UEs at least in the corresponding cell. When SRS subframe configurations that do not satisfy the restrictions are signaled to the UE, the UE may ignore the SRS subframe configurations and perform PUSCH rate matching according to the same cell-specific SRS subframe configurations as those applied to the legacy UEs.

FIG. 10 is a block diagram for an example of a communication device according to one embodiment of the present invention.

Referring to FIG. 10, a communication device 1000 may include a processor 1010, a memory 1020, an RF module 1030, a display module 1040, and a user interface module 1050.

Since the communication device 1000 is depicted for clarity of description, prescribed module(s) may be omitted in part. The communication device 1000 may further include necessary module(s). And, a prescribed module of the communication device 1000 may be divided into subdivided modules. A processor 1010 is configured to perform an operation according to the embodiments of the present invention illustrated with reference to drawings. In particular, the detailed operation of the processor 1010 may refer to the former contents described with reference to FIG. 1 to FIG. 9.

The memory 1020 is connected with the processor 1010 and stores an operating system, applications, program codes, data, and the like. The RF module 1030 is connected with the processor 1010 and then performs a function of converting a baseband signal to a radio signal or a function of converting a radio signal to a baseband signal. To this end, the RF module 1030 performs an analog conversion, amplification, a filtering, and a frequency up conversion, or performs processes inverse to the former processes. The display module 1040 is connected with the processor 1010 and displays various kinds of informations. And, the display module 1040 can be implemented using such a well-known component as an LCD (liquid crystal display), an LED (light emitting diode), an OLED (organic light emitting diode) display and the like, by which the present invention may be non-limited. The user interface module 1050 is connected with the processor 1010 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

While the method for controlling uplink transmission power in a wireless communication system and the apparatus therefor have been described on the basis of 3GPP LTE, the present invention is applicable to various wireless communication systems other than 3GPP LTE.

The invention claimed is:

1. A method for a user equipment (UE) to transmit a sounding reference signal to a base station in a wireless communication system supporting eIMTA (Enhanced Interference Management and Traffic Adaptation), the method comprising:
receiving a higher layer signaling regarding configuration of a first subframe set and a second subframe set; and
transmitting the sounding reference signal to the base station on subframe 'i',
wherein the 'i' is a subframe number and an integer equal to or greater than 0,
wherein transmission power of the sounding reference signal transmitted on the subframe 'i' is determined based on $f_c(i)$ for the first subframe set, and $f_c^{(0)}(i)$ for the second subframe set,
wherein the $f_c(i)$ is a current physical uplink shared channel (PUSCH) power control adjustment state for serving cell 'c' in subframe 'i' belonging to the first subframe set, and the)$f_c^{(0)}(i)$ is a current PUSCH power control adjustment state for serving cell 'c' in subframe 'i' belonging to the second subframe set, and
wherein the $f_c(i)$ is separately accumulated from a value of a previous subframe belonging to the first subframe set while the $f_c^{(0)}(i)$ is separately accumulated from a value of a previous subframe belonging to the second subframe.

2. The method according to claim 1, wherein the uplink subframe included in the second subframe set is a subframe changeable to a downlink subframe according to instruction of the base station.

3. The method according to claim 1, wherein the first subframe set and the second subframe set include at least one of an uplink subframe and a special subframe,
wherein the special subframe includes a region for uplink transmission, and
wherein only the sounding reference signal is transmitted in the region for uplink transmission.

4. The method according to claim 1, wherein the transmission power of the sounding reference signal transmitted in a first special subframe and the transmission power of the sounding reference signal transmitted in a second special subframe are independently determined.

5. A method for a base station to receive a sounding reference signal from a user equipment (UE) in a wireless communication system supporting eIMTA (Enhanced Interference Management and Traffic Adaptation), the method comprising:
transmitting a higher layer signaling regarding configuration of a first subframe set and a second subframe set; and
receiving the sounding reference signal from the UE on subframe 'i',
wherein the 'i' is a subframe number and an integer equal to or greater than 0,
wherein transmission power of the sounding reference signal received on subframe 'i' is determined based on $f_c(i)$ for the first subframe set, and $f_c^{(0)}(i)$ for the second subframe set,
wherein the $f_c(i)$ is a current physical uplink shared channel (PUSCH) power control adjustment state for serving cell 'c' in subframe 'i' belonging to the first subframe set, and the $f_c^{(0)}(i)$ is a current PUSCH power control adjustment state for serving cell 'c' in subframe 'i' belonging to the second subframe set, and
wherein the $f_c(i)$ is separately accumulated from a value of a previous subframe belonging to the first subframe set while the)$f_c^{(0)}(i)$ is separately accumulated from a value of a previous subframe belonging to the second subframe.

6. The method according to claim 5 wherein the uplink subframe included in the second subframe set is a subframe changeable to a downlink subframe according to instruction of the base station.

7. The method according to claim 5, wherein the first subframe set and the second subframe set include at least one of an uplink subframe and a special subframe,
   wherein the special subframe includes a region for uplink transmission, and
   wherein only the sounding reference signal is transmitted in the region for uplink transmission.

8. The method according to claim 5, wherein the transmission power of the sounding reference signal transmitted in a first special subframe and the transmission power of the sounding reference signal transmitted in a second special subframe are independently determined.

* * * * *